No. 724,509. PATENTED APR. 7, 1903.
I. SARTAIN.
WAGON BRAKE.
APPLICATION FILED DEC. 13, 1902.
NO MODEL.
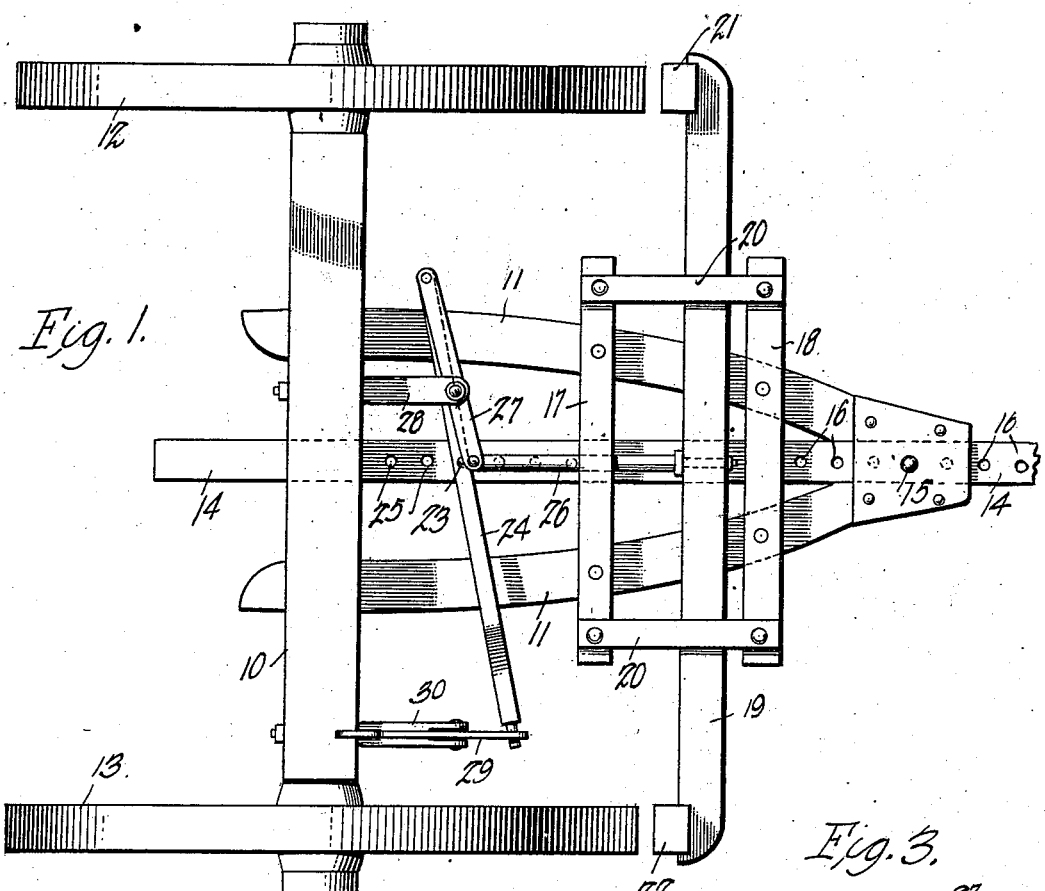
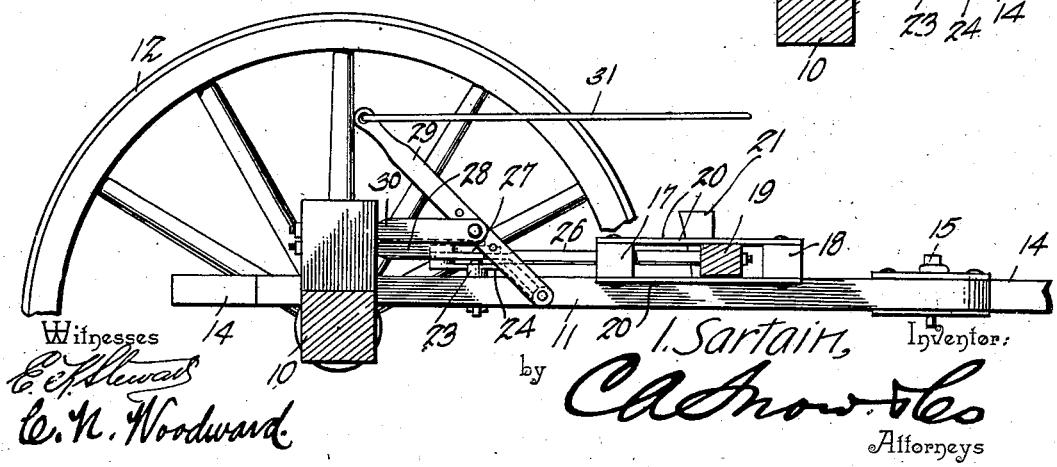
Witnesses
C. F. Stewart
C. N. Woodward.
I. Sartain, Inventor
by C. A. Snow & Co.
Attorneys

UNITED STATES PATENT OFFICE.

ISAAC SARTAIN, OF TRACY CITY, TENNESSEE, ASSIGNOR OF ONE-HALF TO JOHN E. PATTON, OF TRACY CITY, TENNESSEE.

WAGON-BRAKE.

SPECIFICATION forming part of Letters Patent No. 724,509, dated April 7, 1903.

Application filed December 13, 1902. Serial No. 135,137. (No model.)

*To all whom it may concern:*

Be it known that I, ISAAC SARTAIN, a citizen of the United States, residing at Tracy City, in the county of Grundy and State of Tennessee, have invented a new and useful Wagon-Brake, of which the following is a specification.

This invention relates to vehicle-brakes, more particularly to those employed upon farm or lumber wagons, and has for its object to simplify the construction and increase the power and so dispose the parts that the driver is enabled to control and operate the brake from any point on the vehicle or from points entirely disconnected from the vehicle; and the invention consists in certain novel features of the construction, as hereinafter shown and described, and specified in the claim.

In the drawings illustrative of the invention, Figure 1 is a plan view of the rear running-gear of a wagon with the improvement applied. Fig. 2 is a side elevation of the same with one wheel removed and the axle in section. Fig. 3 is a sectional detail of parts of the lever mechanism.

The improved brake mechanism may be applied to any of the various forms of wagons employed upon farms or for hauling heavy loads, and for the purpose of illustration the improved device is shown applied to the ordinary rear running-gear of a wagon of this class, 10 representing the rear axle, 11 the rear hounds, 12 13 the rear wheels, and 14 the coupling-reach adapted to be adjustably connected to the running-gear by the pin 15, the reach having the usual spaced perforations 16 for the pin to enable the reach to be adjusted relative to the running-gear, all these parts being of the usual construction.

Transversely connected to the rear running-gear are spaced guide-bars 17 18, and between these guide-bars the brake-beam 19 is disposed, as shown, being supported movably relative to the guide-bars by straps 20, connecting the upper and lower surfaces near their ends, as shown, the straps preventing vertical movement of the brake-beam, while at the same time leaving it free to move laterally and longitudinally.

The ends of the brake-beam are provided with brake-shoes 21 22 of any approved form, disposed in operative relation to the rear wheels.

Pivotally connected at 23 to the reach member 14, between the guide member 17 and the axle 10, is a relatively long lever 24, the reach being provided with spaced perforations 25, corresponding to the perforations 16, so that when the reach is adjusted relative to the running-gear by the pin 15 the pivot-bolt 23 may likewise be correspondingly adjusted, so that the relative position of the lever and brake-beam may be maintained.

Extending from the center of the brake-beam rearwardly is a rod 26, the rod passing through the rear guide member 17, as shown, the member 17 thus serving as a guide to the rod as well as a guide to the brake-beam.

Between the rear end of the rod 26 and the shorter end of the lever 24 is a relative short lever 27, pivotally connected, respectively, by its opposite ends to the rear end of the rod 26 and the shorter end of the longer lever, as shown.

The lever 27 is connected intermediately to the rear axle by a fulcrum-standard 28, as shown.

The longer end of the lever 24 is connected to an operating-lever 29, the latter fulcrumed to the running-gear by a standard 30, as shown. From the free end of the lever 29 a draw cord or rod 31 is conducted to any part of the vehicle and may be provided with the usual brake-lever, or any other suitable means may be employed to operate the cord or rod, and I do not, therefore, desire to be limited to any specific means for operating this portion of the device, as any approved means may be employed for this purpose. The cord or rod may be led to a point entirely disconnected from the vehicle—such, for instance, to the saddle-bow of one of the horses when the driver is hauling loads that require him to ride one of the horses or to any other point adjacent to or connected with the vehicle. When the parts are thus arranged, it is obvious that any power applied to the upper end of the operating-lever 29 will be transmitted through the levers 24 27 and rod 26 to the brake-beam 19 and draw the shoes 21 22 forcibly against the rear wheels 12 13, the force depending upon the relative lengths of the levers and the locations of their several fulcrum-points. It will be noted that the draft upon the brake-beam is applied centrally thereof, so that both shoes will be applied with equal force upon the wheels 12 13 and the strains thereby equalized and unequal strains correspondingly obviated. It will also be noted that by this arrangement the brake-beam is prevented from longitudinal movement by the rod 26, which thus serves not only as a means for applying the draft, but also as a stop or check to prevent longitudinal movement, while at the same time permitting the requisite lateral movement to the brake-beam. This is an important feature of the invention and adds materially to the efficiency of the device and greatly simplifies the construction. The whole device is very compact in construction, of few parts, and can be manufactured and applied very cheaply and can be formed to produce a very strong pressure by the expenditure of a relatively small amount of power. By this arrangement the "throw" of the parts is materially greater than with devices of this class as heretofore constructed, so that when the brake is out of action shoes 21 22 stand at a much greater distance from the wheels than usual. This is also an important advantage, as any tendency of the brake-shoes to prematurely or accidentally engage the wheels is thereby obviated.

Having thus described my invention, what I claim is—

In a wagon-brake, the combination of the rear running-gear carrying the rear wheels and with the coupling-reach adjustably connected thereto, a brake-beam movably disposed upon said running-gear and having brake-shoes in operative position relative to said wheels, a relatively long lever-arm pivotally connected adjustably to said reach, a relatively short lever-arm movably connected by one end to one end of said longer lever-arm and by its other end to said brake-beam, means for intermediately connecting said shorter lever-arm movably to said running-gear, and means under the control of the driver for operating said longer lever-arm to set and release the brake, substantially as described.

In testimony that I claim the foregoing as my own I have hereto affixed my signature in the presence of two witnesses.

ISAAC SARTAIN.

Witnesses:
W. N. BYERS,
D. H. GRISWOLD.